(12) United States Patent
Zohar et al.

(10) Patent No.: US 7,620,843 B2
(45) Date of Patent: Nov. 17, 2009

(54) REBUILDING A STORAGE SYSTEM

(75) Inventors: Ofir Zohar, Alfe-Menashe (IL); Shemer Schwartz, Tel Aviv (IL); Dror Cohen, Tel Aviv (IL); Haim Helman, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 11/582,664

(22) Filed: Oct. 17, 2006

(65) Prior Publication Data

US 2008/0091741 A1   Apr. 17, 2008

Related U.S. Application Data

(63) Continuation-in-part of application No. 11/070,752, filed on Mar. 2, 2005.

(51) Int. Cl.
  *G06F 11/00* (2006.01)
(52) U.S. Cl. .............................. 714/6; 714/5; 711/114; 711/162; 707/202
(58) Field of Classification Search ............ 714/5, 714/6; 707/202; 711/114, 162
See application file for complete search history.

(56) References Cited

U.S. PATENT DOCUMENTS

| 6,880,051 | B2 * | 4/2005 | Timpanaro-Perrotta | 711/162 |
| 7,073,036 | B2 * | 7/2006 | Furuya et al. | 711/162 |
| 7,266,718 | B2 * | 9/2007 | Idei et al. | 714/6 |

* cited by examiner

*Primary Examiner*—Robert Beauoliel
*Assistant Examiner*—Philip Guyton
(74) *Attorney, Agent, or Firm*—Griffiths & Seaton PLLC

(57) ABSTRACT

A method for managing a storage system, including storing first and second sets of data on a storage device in the system. The method further includes assigning a first restore preference level to the first set and a second restore preference level to the second set, such that applying the first level and the second level respectively to the first and second sets rebuilds the first set before the second set irrespective of physical locations and logical addresses of the sets on the storage device.

The method also includes receiving an indication of a failure in the storage device, generating a command to rebuild the first set as a first restored set and the second set as a second restored set, and in response to the command, rebuilding the first set of the data and the second set of the data according to the respective restore preference levels.

36 Claims, 7 Drawing Sheets

FIG. 2

| PARTITION | PREF. LEVEL | D1 | D2 | D3 | D4 | D5 |
|---|---|---|---|---|---|---|
| P1 | A | B1 | B2 | B3 | B4 | Py1 |
| P2 | B | Py5 | B5 | B6 | B7 | B8 |
| P3 | C | B12 | Py9 | B9 | B10 | B11 |
| P4 | A | B15 | B16 | Py13 | B13 | B14 |
| P5 | B | B18 | B19 | B20 | Py17 | B17 |
| P6 | C | B21 | B22 | B23 | B24 | Py21 |

⎫ 48

| DEVICE D1 | |
|---|---|
| BLOCK | PREF. LEVEL |
| B1 | A |
| Py5 | B |
| B12 | C |
| B15 | A |
| B18 | B |
| B21 | C |

⎫ 47

| DEVICE D3 | |
|---|---|
| BLOCK | PREF. LEVEL |
| B3 | A |
| B6 | B |
| B9 | C |
| Py13 | A |
| B20 | B |
| B23 | C |

| HOST | PARTITION | PREF. LEVEL | LU | SUB-PREF. LEVEL | D1 | D2 | D3 | D4 | D5 |
|---|---|---|---|---|---|---|---|---|---|
| H1 | P1 | A | - | - | B1 | B2 | B3 | B4 | Py1 |
| H1 | P2 | B | - | - | Py5 | B5 | B6 | B7 | B8 |
| H2 | P3 | C | LU1 | a | B12(1) | Py9(1) | B9(1) | B10(1) | B11(1) |
| H2 | P3 | C | LU2 | b | B12(2) | Py9(2) | B9(2) | B10(2) | B11(2) |
| H2 | P4 | A | LU3 | c | B15(3) | B16(3) | Py13(3) | B13(3) | B14(3) |
| H2 | P4 | A | LU4 | d | B15(4) | B16(4) | Py13(4) | B13(4) | B14(4) |
| H3 | P5 | B | - | - | B18 | B19 | B20 | Py17 | B17 |
| H4 | P6 | C | - | - | B21 | B22 | B23 | B24 | Py21 |

147 — DEVICE D1

| BLOCK | PREF. LEVEL | SUB-PREF. LEVEL |
|---|---|---|
| B1 | A | - |
| Py5 | B | - |
| B12(1) | C | a |
| B12(2) | C | b |
| B15(3) | A | c |
| B15(4) | A | d |
| B18 | B | - |
| B21 | C | - |

149 — DEVICE D3

| BLOCK | PREF. LEVEL | SUB-PREF. LEVEL |
|---|---|---|
| B3 | A | - |
| B6 | B | - |
| B9(1) | C | a |
| B9(2) | C | b |
| Py13(3) | A | c |
| Py13(4) | A | d |
| B20 | B | - |
| B23 | C | - |

FIG. 6

Table 248:

| PREF. LEVEL | D1 | D2 | D3 | D4 | D5 | | D6 | D7 | D8 | D9 | D10 | D11 |
|---|---|---|---|---|---|---|---|---|---|---|---|---|
| A | B1 | B2 | B3 | B4 | --- | | B1' | B2' | B3' | B4' | --- | B5' |
| B | --- | B5 | B6 | B7 | B8 | | B6' | B7' | B8' | --- | --- | B10' |
| C | B12 | --- | B9 | B10 | B11 | | B11' | B12' | --- | B13' | B9' | --- |
| A | B15 | B16 | --- | --- | B13 B14 | | B16' | --- | B17' | B18' | B14' | B15' |
| B | B18 | B19 | B20 | --- | B17 | | --- | B21' | B22' | B23 | B19' | B20' |
| C | B21 | B22 | B23 | B24 | --- | | --- | --- | --- | --- | B24 | --- |

MIRRORS

Table 247 — DEVICE D8:

| BLOCK | PREF. LEVEL |
|---|---|
| B3' | A |
| B8' | B |
| B17' | B |
| B22' | C |

Table 249 — DEVICE D3:

| BLOCK | PREF. LEVEL |
|---|---|
| B3 | A |
| B6 | B |
| B9 | C |
| B20 | B |
| B23 | C |

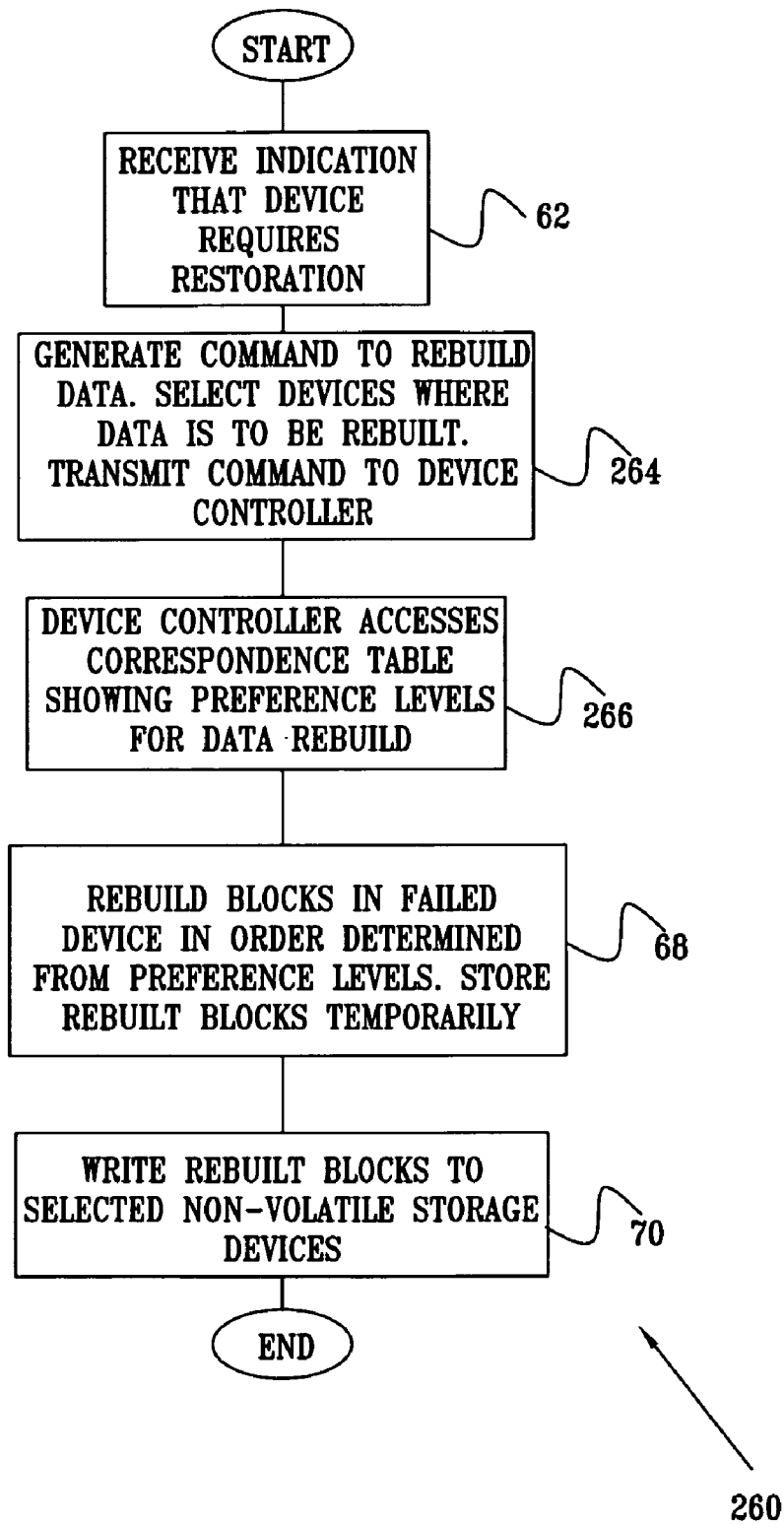

REBUILDING A STORAGE SYSTEM

CROSS-REFERENCE TO RELATED APPLICATIONS

This application is a continuation-in-part of U.S. patent application Ser. No. 11/070,752, filed Mar. 2, 2005.

FIELD OF THE INVENTION

The present invention relates generally to data storage, and specifically to a system for rebuilding data in the storage system.

BACKGROUND OF THE INVENTION

As data storage systems increase in size, the probability that at least some part of the system will become inoperative, for instance by a mass storage device temporarily or permanently failing, increases. On such a failure, the data needs to be restored. Typically, when the data is stored, redundancy is provided, by storing extra data such as one or more parity blocks in the storage system. The extra data enables the failure of the mass storage device to be remedied, by allowing the data on the failed mass storage device to be recovered.

However, an improvement in data recovery performance of the storage system would be advantageous.

SUMMARY OF THE INVENTION

In an embodiment of the present invention, a data storage system stores a plurality of data blocks, and an operator of the storage system assigns a restore-data preference level to each of the data blocks. A data storage system processor stores the preference levels, also herein termed priority levels, and uses them if two or more of the data blocks in the system require restoration, for example if a mass storage device in the storage system fails. In the event of data blocks requiring restoration, the processor rebuilds the data blocks, and prioritizes the rebuilding according to the respective stored preference levels. The rebuilding is performed using redundant data, associated with the data blocks, that is stored in the storage system.

The processor implements the restoration so that restored data blocks with a higher preference level typically become accessible before restored data blocks with a lower preference level. By storing preference levels, and applying the preference levels when data blocks need to be rebuilt, embodiments of the present invention allow an operator of the storage system flexibility in operation of the system, and improve the efficiency of rebuilding compared to storage systems which do not have restore-data preference levels assigned to stored data blocks.

In some embodiments the processor uses a controller of the failed mass storage device to rebuild the data blocks. Alternatively, the processor may rebuild the data blocks without using the controller.

The redundant data may comprise copies of the data blocks. The copies of the data blocks have the same preference levels as the data blocks.

Alternatively, the redundant data may comprise parity blocks having preference levels corresponding to the data blocks they are protecting. In rebuilding the data stored on the failed mass storage device, the processor may first rebuild the data blocks according to their stored preference levels, and then rebuild the parity blocks. Alternatively, the processor may rebuild the data blocks and the parity blocks according to their stored preference levels.

In some embodiments the data storage system comprises a distributed system, wherein individual components of the system are remote from each other. Alternatively, the data storage system comprises a substantially centralized system. Further alternatively, the storage system comprises a combination of a centralized and a distributed system.

There is therefore provided, according to an embodiment of the present invention, a method for managing a data storage system, including:

storing a first set of data and a second set of the data on a storage device in the data storage system;

assigning a first restore preference level to the first set of the data and a second restore preference level to the second set of the data, such that applying the first restore preference level to the first set and applying the second restore preference level to the second set rebuilds the first set before the second set irrespective of physical locations and logical addresses of the sets of the data on the storage device;

receiving an indication of a failure in the storage device;

in response to the indication, generating a command to rebuild the first set of the data as a first restored set of the data and the second set of the data as a second restored set of the data; and in response to the command, rebuilding the first set of the data and the second set of the data according to the respective restore preference levels.

Typically, receiving the indication includes a processing unit operating the data storage system receiving the indication, and generating the command includes the processing unit generating the command. The storage device may be coupled to a cache having a cache controller, and the cache controller may be configured to operate the storage device and to receive the command.

In some embodiments rebuilding the first set of the data and the second set of the data includes choosing a selected storage device to receive the first restored set of the data and the second restored set of the data. The selected storage device and the storage device may be a common device, or different devices.

In one embodiment, storing the first and second sets of the data includes storing redundancy data for the data within the storage system, and rebuilding the first set of the data and the second set of the data includes implementing the redundancy data. Typically, the first set of data includes a first set of data blocks and a first set of parity blocks included in the redundancy data, and the second set of data includes a second set of data blocks and a second set of parity blocks included in the redundancy data, and rebuilding the first set of the data and the second set of the data includes rebuilding the first set of the data blocks and the second set of the data blocks according to the respective restore preference levels.

Alternatively, the first set of data includes a first set of data blocks and a first set of parity blocks included in the redundancy data, and the second set of data comprises a second set of data blocks and a second set of parity blocks included in the redundancy data, and rebuilding the first set of the data and the second set of the data includes rebuilding the first set of the data blocks and the first set of the parity blocks, and the second set of the data blocks and the second set of the parity blocks, according to the respective restore preference levels.

Typically, storing redundancy data for the data includes storing copies of the data within the storage system.

In a disclosed embodiment the first set of the data includes a first subset of the data and a second subset of the data, wherein assigning the first preference level includes assigning a first restore sub-preference level to the first subset and a second restore sub-preference level to the second subset, such that applying the first restore sub-preference level to the first subset and applying the second restore sub-preference level to the second subset rebuilds the first subset before the second subset irrespective of physical locations and logical addresses of the subsets of the data on the storage device, wherein generating the command includes generating a command to rebuild the first subset of the data as a first restored subset of the data and the second subset of the data as a second restored subset of the data, and wherein rebuilding the first set of the data includes rebuilding the first subset and the second subset according to the respective restore sub-preference levels.

The method may include making the first restored set of the data accessible prior to accessibility of the second restored set of the data.

In other disclosed embodiments rebuilding the first set before the second set includes making all the first set accessible before all the second set are accessible, or initiating restoration of all the first set before initiating restoration of any of the second set, or ensuring that at any time during rebuilding, more of the first set of the data are being processed than the second set of the data, or ensuring that at any time during rebuilding, an amount X of the first set of the data and an amount Y of the second set of the data have been processed, where a fraction $$\frac{X}{Y}$$

is predefined by an operator of the storage system and where the fraction $$\frac{X}{Y}$$

is greater than one.

In some embodiments the storage device includes a pending transaction queue, and rebuilding the first set before the second set includes ensuring that, at any time during rebuilding, an amount X of transactions in the queue related to the first set of the data and an amount Y of transactions in the queue related to the second set of the data have been processed, where a fraction $$\frac{X}{Y}$$

is predefined by an operator of the storage system and where the fraction $$\frac{X}{Y}$$

is greater than one.

There is further provided, according to an embodiment of the present invention, apparatus for managing a data storage system, including:

a processing unit which is configured to:

store a first set of data and a second set of the data on one of a plurality of storage devices, assign a first restore preference level to the first set of the data and a second restore preference level to the second set of the data, such that applying the first restore preference level to the first set and applying the second restore preference level to the second set rebuilds the first set before the second set irrespective of physical locations and logical addresses of the sets of the data on the one storage device, receive an indication of a failure in the one storage device, in response to the indication, generate a command to rebuild the first set of the data as a first restored set of the data and the second set of the data as a second restored set of the data, and in response to the command, rebuild the first set of the data and the second set of the data according to the respective restore preference levels.

There is further provided, according to an embodiment of the present invention, a computer software product for managing a data storage system, the product including a computer-readable medium having computer program instructions recorded therein, which instructions, when read by a computer, cause the computer to:

store a first set of data and a second set of the data on a storage device in the data storage system;

assign a first restore preference level to the first set of the data and a second restore preference level to the second set of the data, such that applying the first restore preference level to the first set and applying the second restore preference level to the second set rebuilds the first set before the second set irrespective of physical locations and logical addresses of the sets of the data on the storage device;

receive an indication of a failure in the storage device;

in response to the indication, generate a command to rebuild the first set of the data as a first restored set of the data and the second set of the data as a second restored set of the data; and in response to the command, rebuild the first set of the data and the second set of the data according to the respective restore preference levels.

The present invention will be more fully understood from the following detailed description of the embodiments thereof, taken together with the drawings in which:

BRIEF DESCRIPTION OF THE DRAWINGS

FIG. 2 shows entries in correspondence tables of the storage system, according to an embodiment of the present invention;

FIG. 4 shows entries in alternative correspondence tables of the storage system, according to an embodiment of the present invention

FIG. 6 shows entries in correspondence tables of the alternate storage system, according to an embodiment of the present invention; and FIG. 7 is a flowchart showing steps performed in rebuilding data stored on a given device of the alternate storage system, according to an embodiment of the present invention.

DETAILED DESCRIPTION OF EMBODIMENTS

Figure 1:
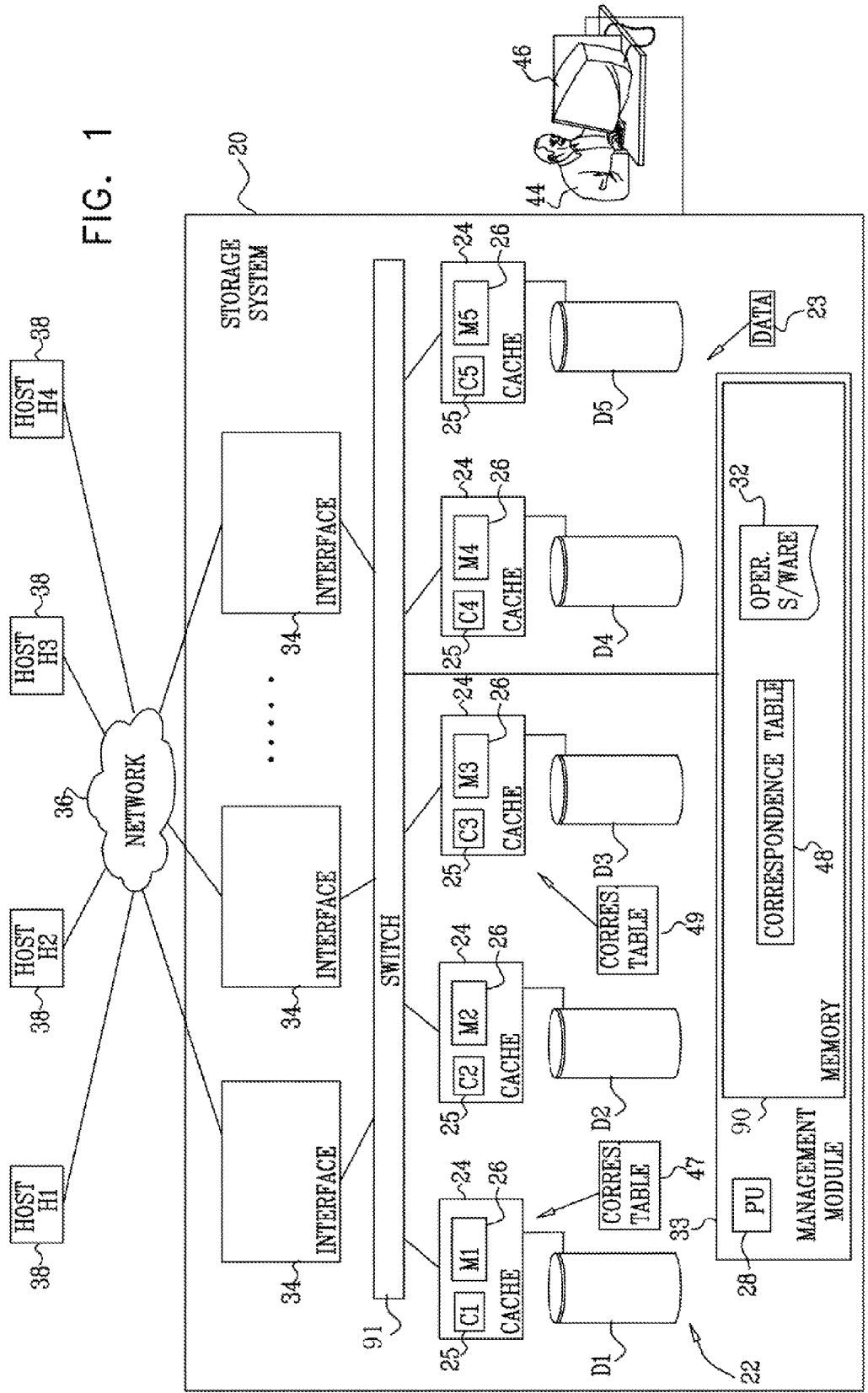
FIG. 1 is a schematic diagram of a storage system, according to an embodiment of the present invention.

Reference is now made to FIG. 1, which is a schematic diagram of a storage system 20, according to an embodiment of the present invention. Storage system 20 comprises a plurality of non-volatile data storage devices 22 which store data 23. Devices 22 are coupled to device caches 24. Herein, specific devices 22 are also referred to as device D1, D2, D3, D4, and D5. Typically, devices D1, D2, . . . are parts of respective sets of devices 22, each set being coupled to one cache 24. For clarity, the separate sets are not shown in FIG. 1.

Each cache 24 includes a controller 25 for its set of devices, and also includes a memory 26, typically a non-volatile memory. Controllers 25 and memories 26 for devices D1, D2, D3, D4, and D5 are also referred to herein respectively as controllers C1, C2, C3, C4, and C5, and memories M1, M2, M3, M4, and M5. A switch 91 couples caches 24 to one or more storage system interfaces 34. One or more hosts 38 are coupled to the interfaces, typically via a network 36, so that the hosts may store data in, and read data from, the system, using the interfaces to transfer the data between the hosts and system 20. A given host 38 may also be coupled directly to a given interface 34. Hosts 38 are also referred to herein as hosts H1, H2, H3, and H4. A management module, which may be a single unit having a processing unit and a memory, or a multiplicity of units with respective processing units and memories, operates the storage system. Herein, by way of example, the management module is assumed to be a management module 33 comprising a processing unit (PU) 28 and a memory 30. Module 33 uses operating software 32, stored in memory 30, to operate system 20 according to principles described herein. Software 32 can be supplied in electronic form or on tangible media such as a magnetic storage disc or a compact disc which are readable by a computer, or other means known in the art for permanent storage of electronic data.

The operation of the storage system is under the overall control of a human operator 44, typically via a user interface 46, although module 33 normally operates the system without human intervention. Storage system 20 may be implemented as a distributed system, so that elements of the system are situated in physically separate locations, and communicate with each other over communication links. Alternatively, storage system 20 may be implemented as a centralized system in one physical location. Further alternatively, system 20 may be implemented as a combination of one or more centralized systems with a distributed system.

Data 23 is in the form of data blocks BI, where I is a positive integer, and the blocks are referred to herein generically as data blocks B. By way of example, data blocks B are assumed to have a size of eight bits, but the data blocks may be of substantially any integral number of bits, the size may range from less than eight bits to gigabytes or more, and the size of the blocks is not necessarily equal. Typically, operator 44 uses PU 28 to organize data blocks B into partitions P1, P2, . . . , and memories 26 and/or memory 30 include one or more correspondence tables giving a relationship between the specific partitions, specific data blocks B, and devices 22 where the data blocks are located. Thus, one partition may include multiple data blocks B spread over a number of storage devices 22, for example, as described in U.S. application Ser. No. 10/620,080. Controllers 25 and/or PU 28 may use the correspondence tables to access data blocks B. An exemplary correspondence table 48 is stored in memory 30. Exemplary correspondence tables 47, 49 are stored in memories M1 and M3 respectively. Correspondence tables 47, 48, and 49 are described in more detail below with reference to FIG. 2. Operations performed by controllers 25 and/or PU 28 are completely transparent to hosts 38, and are also completely independent of host activity.

Data on devices 22 is stored redundantly, typically according to one of the redundant array of independent disks (RAID) schemes known in the art. Details of some RAID schemes are published by the University of California, Berkeley. Proprietary RAID schemes are also known in the art. In addition, combinations and variations on the published RAID schemes are also known in the art. Furthermore, methods other than the published RAID schemes and their combinations and variations are known in the art. Such combinations, variations and other methods are assumed to be comprised within the scope of the present invention.

Depending on the RAID scheme used, e.g., for RAID 1, RAID 2, RAID 3, RAID 4, RAID 5, and RAID 6, stored data on devices 22 may be completely recovered on failure of one or more of the devices. For example, RAID 1 and RAID 5 provide complete protection if one device 22 fails, RAID 6 provides complete protection if two devices 22 fail.

Herein, except where otherwise stated, storage system 20 is assumed to store data blocks BI according to a RAID 5 protocol, wherein a parity block is calculated for every four data blocks, and wherein the parity block and the four data blocks are stored on separate devices 22. A convention herein terms the parity block for four data blocks B having a first block Bn parity block Pyn. Thus a parity block Py1 is calculated for blocks B1-B4.

For each data block BI stored on devices 22, PU 28 assigns a preference level to the data block, the preference level being provided to the processing unit by operator 44. The preference level is listed in correspondence tables 47, 48, and 49. As described in more detail below, the preference level is used by PU 28 to determine a priority for restoring data blocks in one or more devices 22. Typically, if the data blocks are organized into partitions as described above, operator 44 provides the preference level to the processing unit by assigning the levels to the partitions.

In some embodiments of the present invention, each host may be assigned one or more partitions, and the operator may assign the preference levels to the partitions by assigning the preference levels to the respective hosts. In one embodiment of the present invention, further prioritization of the stored data is possible. For example, typically a host divides its one or more assigned partitions into logical units (LUs). As described in more detail below, the host may assign preference levels, herein termed sub-preference levels, to two or more of its LUs. An example of such further prioritization is described with reference to FIG. 4.

In some embodiments of the present invention, each device 22 is arranged to maintain free space for the purpose of receiving restored copies of data of a failed device. In these embodiments, module 33 is configured to automatically select an available device 22 to receive the data copies. An application of this procedure is described in more detail with respect to FIG. 3 below.

FIG. 2 shows entries in correspondence tables 47, 48, and 49, according to an embodiment of the present invention. Table 48 shows locations, in devices 22, of blocks B that are assigned to specific partitions. Each partition is assumed to be formed of four data blocks that are stored on separate devices 22. Thus, partition P3 comprises blocks B9, B10, B11, and B12, that are respectively stored on devices D3, D4, D5, and D1. In addition, for each partition, i.e., each set of four data blocks, PU 28 calculates a parity block that it stores on a device separate from the devices of the data blocks. Thus PU 28 calculates a parity block Py9, and stores the parity block on device D2.

Table 48 also lists a preference level for each data block stored in the respective device. By way of example, operator 44 assigns preference levels by partition, so that each block of a partition has the same preference level. Herein different preference levels are indicated by different letters A, B, C, . . . . By way of example, data blocks having preference level A have a higher priority for restoration than data blocks with preference level B, and data blocks having preference level B have a higher priority for restoration than data blocks with preference level C.

The method of applying the preference levels to achieve restoration, i.e., rebuilding, of data blocks may be defined by operator 44 in a number of different ways. For example, if a group 1 of data blocks has a preference level A, and a group 2 of data blocks has a preference level B, the operator may configure module 33 to rebuild by:

making all group 1 accessible before all group 2 are accessible; or initiating restoration of all group 1 before initiating restoration of any of group 2; or ensuring that at any time during the rebuilding process, more data blocks of group 1 are being processed than data blocks of group 2; or ensuring that at any time during the rebuilding process, X data blocks of group 1 and Y data blocks of group 2 have been processed, where the fraction $$\frac{X}{Y}$$

is predefined by the operator and is greater than one.

US patent application 20060200456, which is assigned to the assignee of the present application and which is incorporated herein by reference, describes pending transaction queues that are used for transactions of devices such as devices 22. Failure of a specific device 22 typically leaves the pending transaction queues accessible to the controller of the device, and/or to PU 28. The controller or the processing unit may be configured to rebuild the data blocks in the failed device while implementing the requests in the queues, and to use the requests to ensure that the preferences for rebuilding the data blocks are complied with. For example, if a group 1 of data blocks has a preference level A, and a group 2 of data blocks has a preference level B, the operator may configure module 33 to rebuild by ensuring that at any time during the rebuilding process, X transactions related to group 1 and Y transactions related to group 2 have been processed, where the fraction $$\frac{X}{Y}$$

is predefined by the operator and is greater than one.

Other methods for defining how the preference levels may be applied to rebuilding data blocks will be apparent to those having ordinary skill in the art. All such methods are included in the scope of the present invention.

Alternatively or additionally, PU 28 calculates and stores tables 47 and 49. PU 28 may derive tables 47 and 49 from table 48, or by any other convenient method. Table 47, which is stored in memory M1, lists the blocks stored in device D1, and the preference level associated with each block of D1. Table 49, which is stored in memory M3, lists the blocks stored in device D3, and the preference level associated with each block of D3. PU 28 may generate tables similar to tables 47 and 49, for devices D2, D4, and D5, and store the tables in respective memories M2, M4, and M5.

Figure 3:
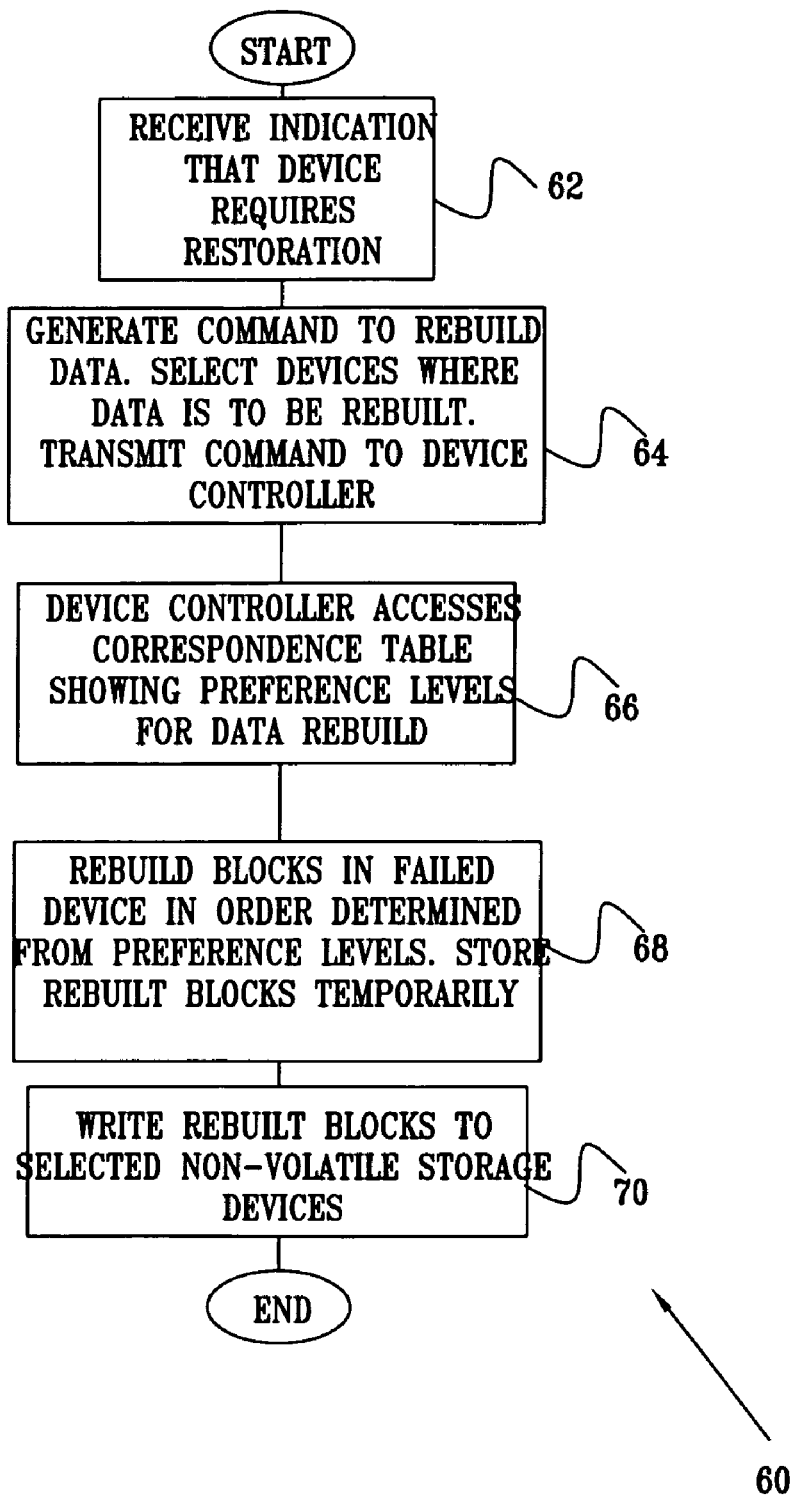
FIG. 3 is a flowchart showing steps performed in rebuilding data stored on a given device of the storage system, according to an embodiment of the present invention.

FIG. 3 is a flowchart 60 showing steps performed in rebuilding data stored on a given device 22, according to an embodiment of the present invention. In a first step 62, PU 28 receives an indication that one of devices 22 has failed and thus requires restoration. Failure of the device is assumed to mean that the device may not be read from correctly, or is unable to have data written correctly to an available section of the device. By way of example, device D3 is assumed to have failed.

In a second step 64, PU 28 generates a command to rebuild the data of the failed device, in this example device D3, as restored data. The processing unit transmits the command to the controller of the failed device, i.e., controller C3. PU 28 typically also issues an alarm to operator 44, using user interface 46.

In embodiments of the present invention comprising devices 22 having maintained free space, as are described above, module 33 selects one or more available devices 22 to receive the restored data. The process of selection is automatic, and is typically derived from instructions issued by operator 44 during setup of system 20.

Alternatively, in response to the alarm, operator 44 selects one or more non-volatile storage devices to which the restored data is to be written. The non-volatile storage devices may be D3, one or more other non-volatile storage devices selected from devices 22, or one or more non-volatile storage devices other than devices 22 that may be provided by operator 44 for the purposes of permanently writing restored values.

Operator 44 typically selects the one or more non-volatile storage devices to which the restored data is to be written according to operating parameters of system 20 that are provided to the operator, usually via user interface 46. For example, if PU 28 indicates that data blocks on device D3 may have become corrupted, but that the device may otherwise be functioning normally, operator may select device D3 as the non-storage device to receive the restored data. Alternatively, if PU 28 indicates that device D3 is unable to receive the restored data, for example if the physical medium of the device appears to have been damaged, operator 44 may select another device or devices with available space, from devices 22, to receive the restored data.

In some embodiments of the present invention, the device or devices to which the restored data is to be written are predetermined, typically by instructions issued by operator 44 during operation of system 20 and prior to the data restoration of flowchart 60. For example, the operator may pre-designate a specific device 22 as the device to receive restored data.

On receipt of the command, in a third step 66, controller C3 accesses correspondence table 49 (stored in memory M3) to derive, from the preference levels listed for each block, an order for rebuilding the blocks. Alternatively, controller C3 may access table 48 in memory 30, to derive the same information that is given in table 49.

In a fourth step 68, controller C3 rebuilds each of the blocks in device D3, in an order given by their respective preference level.

Typically, controller C3 distinguishes between data and parity blocks, and rebuilds the data blocks before the parity blocks, since the data blocks associated with the parity blocks are available to PU 28 on devices other than device D3. Once the data blocks have been rebuilt, controller C3 may rebuild the parity blocks, typically also according to their preference levels. To rebuild the data blocks, controller C3 uses the preference level of each data block to determine the order for building the data blocks. Thus, data block B3 is rebuilt first; data blocks B6 and B20 are rebuilt next; and data blocks B9 and B23 are rebuilt last. For data blocks that are assigned the same preference level, such as blocks B6 and B20, and blocks B9 and B23, controller C3 may rebuild them in any convenient order, within the overall rebuild scheme defined by tables 47 and 48. Typically, controller C3 orders the rebuilding of blocks having the same preference levels according to physical locations of the blocks within their respective storage device. Alternatively, the rebuilding of blocks having the same preference levels is according to another predefined criterion, such as the logical addresses of the blocks.

Each data block rebuilding uses the installed redundancy arrangement of storage system 20. For example, to rebuild data block B3, controller C3 reads the values of data blocks B1, 32, B4, and parity block Py1, from devices D1, D2, D4, and D5, into a temporary buffer in memory M3. In order to locate the data and parity blocks, controller C3 accesses table 48. From the data and parity blocks, controller C3 calculates a restored value of data block B3 and places the restored value into the temporary buffer.

Alternatively, controller C3 may not distinguish between data and parity blocks in applying the preference levels of the correspondence tables. In this case, controller C3 rebuilds parity block Py13 before data blocks B6, B9, B20, and B23, since the parity block has a higher preference level than the data blocks. To rebuild parity block Py13, controller C3 accesses table 48 to locate the data blocks associated with Py13. Thus, from table 48, the controller locates data blocks B13, B14, B15, and B16 on respective devices D4, D5, D1, and D2. From the data blocks, controller C3 calculates a restored value of parity block Py13 and places the restored value into the temporary buffer.

In a final step 70, controller C3 writes the restored values of each rebuilt block to the non-volatile storage device or devices selected in second step 64, so that the restored values are permanently recorded and are accessible. Flowchart 60 then ends. Typically, for each block that is rebuilt according to the steps of flowchart 60, the instructions of the flowchart are performed atomically.

In implementing flowchart 60, PU 28 ensures that the method of applying the preference levels to rebuilding data blocks is as configured by operator 44. Examples of possible configurations have been described above.

As described above, a system processing unit, PU 28, transmits a rebuild command to a cache controller, and the cache controller performs the rebuilding according to the preference levels listed in table 48, and/or in the local tables, such as table 49, of the cache controller. Those having ordinary skill in the art will be able to adapt the above description, mutatis mutandis, for other methods using preference levels that correspond to blocks stored in a storage system. For example, rather than a system processing unit transmitting a general rebuild command to a cache controller, the system processing unit may transmit a series of commands to rebuild specific stored blocks, each of the commands in the series being generated according to preference levels stored in table 48. All such methods are assumed to be comprised within the scope of the present invention.

The description of the steps of flowchart 60 refer to embodiments of the present invention having one level of assigned priority levels. Embodiments of the present invention include multiple priority levels, an example of which is described below with reference to FIG. 4.

FIG. 4 shows entries in correspondence tables 147, 148, and 149, according to an embodiment of the present invention. Tables 147, 148, and 149 are respectively stored in memory 30, memory M1, and memory M3, in place of tables 47, 48, and 49, and except for the differences described below, are generally similar to tables 47, 48, and 49. In tables 147, 148, and 149, host Hi has been assigned partitions P1, P2; host H2 has been assigned partitions P3, P4; host H3 has been assigned partition P5; and host H4 has been assigned partition P6. Host H2 has divided each of its assigned partitions into two logical units (LUs), to form four LUs LU1, LU2, LU3, and LU4. In addition, host H2 has assigned sub-preference levels a, b, c, and d respectively to LU1, LU2, LU3, and LU4. In the tables, the convention B(n) is used to denote that a block B is in an LUn. By way of example, sub-preference level a has a higher priority than sub-preference level b, sub-preference level b has a higher priority than sub-preference level c, and sub-preference level c has a higher priority than sub-preference level d.

In embodiments of the present invention comprising sub-priorities, such as are exemplified in tables 147, 148, and 149, the description of flowchart 60 for rebuilding blocks applies, except for the differences described below.

In the following description of a first example, it is assumed that in step 62, PU 28 receives an indication that blocks stored in device D1 require restoration, and that data blocks are to be restored before parity blocks.

In step 64, PU 28 transmits a rebuild command to cache controller C1, which in step 66 accesses correspondence table 147.

In step 68, controller C1 rebuilds data blocks on device D1 by first considering the preference levels, i.e., A, B, C. For blocks having the same preference level, controller C1 checks for the existence of sub-preference levels. If sub-preference levels exist, controller C1 applies their values in rebuilding the data blocks. Thus, in rebuilding data blocks on device D1, controller C1 rebuilds in the following order: B15(3), B15(4), B1, B18, B12(1), B12(2), B21.

As a second example, PU 28 receives in step 62 an indication that blocks stored in device D3 require restoration, and in this example no distinction is to be made between parity blocks and data blocks. In this case controller C3 rebuilds the blocks on device D3 according to table 149. Thus, controller C3 rebuilds the data and parity blocks in the following order: Py13(3), Py13(4), B3, B6, B20, B9(1), B9(2), B23.

It will be understood that the scope of the present invention comprises data that is stored on devices 22 by substantially any redundant method. Such methods may use parity blocks, as exemplified above, or may not utilize parity blocks. An embodiment of the present invention which does not use parity blocks is described with reference to FIGS. 5, 6, and 7 below.

Figure 5:
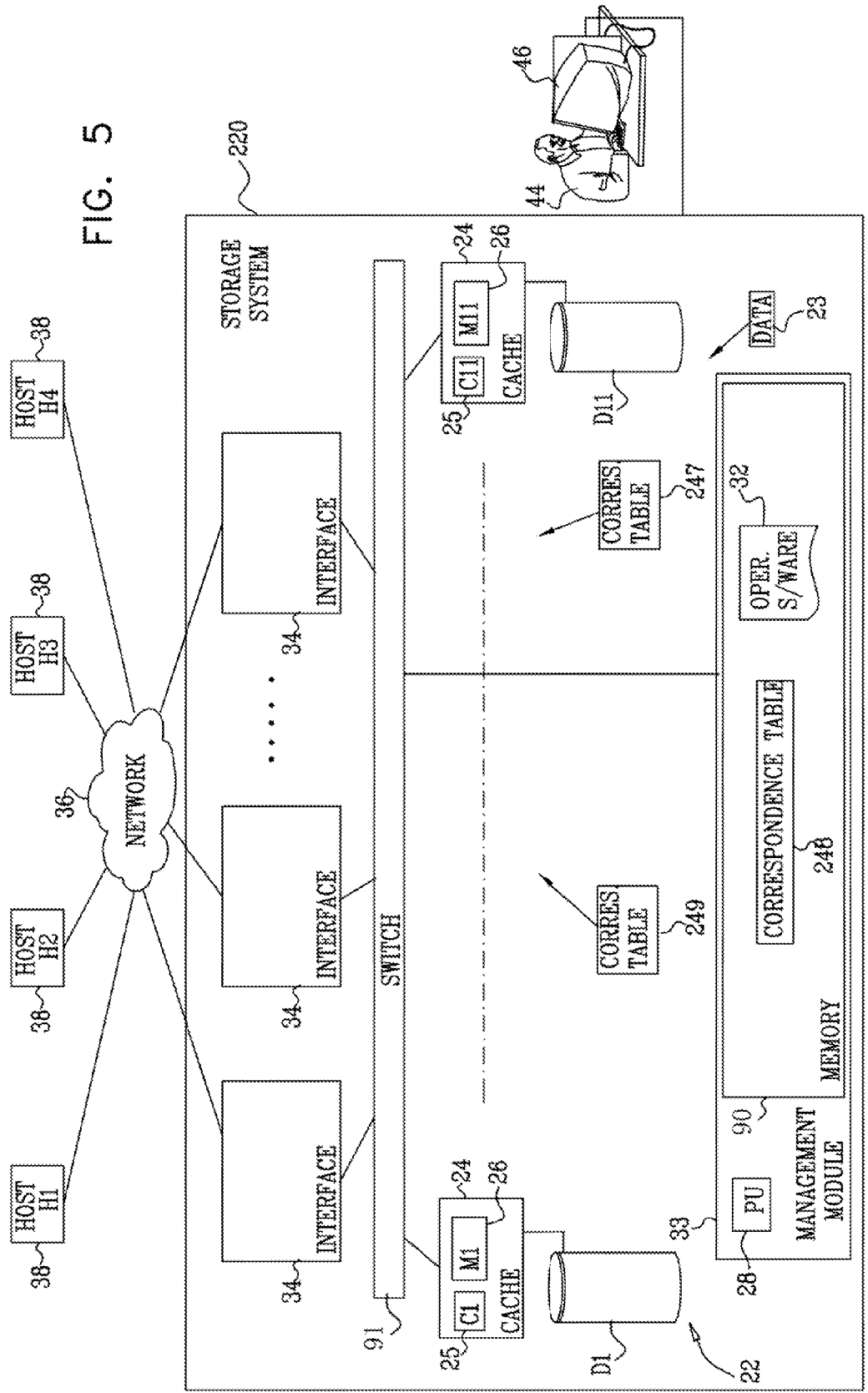
FIG. 5 is a schematic diagram of an alternate storage system, according to an embodiment of the present invention.

FIG. 5 is a schematic diagram of a storage system 220, and FIG. 6 shows entries in correspondence tables 247, 248, and 249, according to embodiments of the present invention. Apart from the differences described below, the operation of system 220 is generally similar to that of system 20 (FIG. 1), such that elements indicated by the same reference numerals in both systems 20 and 220 are generally identical in construction and in operation.

System 220 comprises eleven devices 22, D1, . . . , D11, each coupled to one cache 24, each cache having a respective controller C1, . . . C11 and a respective memory M1, . . . M11, substantially as described above with reference to system 20. Instead of table 48, memory 30 in system 220 has a correspondence table 248 (FIG. 6). Data 23 is stored in the form of data blocks B1, . . . B24 on devices D1, . . . , D5, as shown in table 248. Data blocks B1, . . . B24 are assigned preference levels A, B, or C, as also shown in table 248. For example, data block B15 has preference level A, data block B9 has preference level C, and data block B20 has preference level B. (Data blocks B1, B24 are stored on the same devices 22 and with the same preference levels in both systems 20 and 220, as is shown by a comparison of tables 48 and 248.) However, parity blocks are not used to protect data blocks B1, . . . B24.

In system 220, data blocks B1, . . . B24 are protected by having respective copies of the blocks, shown in table 248 as B1', . . . B24', stored on separate devices D6, . . . D11, so that devices D6, . . . D11 act, by way of example, as mirror devices. However, it will be understood that copies of blocks and original blocks do not need to be on separate devices. For example, device D3 may store blocks B3', B6, B9', B20, and B23; device D8 may store blocks B3, B8, B17', and B22'.

Each data block copy has a preference level which is the same as the preference level of the original data block. For example, data block B15' has preference level A, data block B9' has preference level C, and data block B20' has preference level B.

In addition to storing data blocks and their copies as shown in table 248, each device D1, . . . D11 is assumed to have some reserved space, schematically indicated by "-" in table 248. The reserved space may be used by PU 28 to receive recovered data blocks, as described below.

As described above for system 20, alternatively or additionally to table 248, PU 28 calculates and stores correspondence tables for each of devices 22, and stores them in corresponding memories M1, . . . M11. For each device, the correspondence table lists blocks of the device and respective preference levels of the blocks. By way of example, correspondence table 247 shows the blocks and preference levels for device D8, and correspondence table 249 shows the blocks and preference levels for device D3. Table 247 is stored in memory M8; table 249 is stored in memory M3.

FIG. 7 is a flowchart 260 showing steps performed in rebuilding data stored on one of devices D1, . . . D11, when one of the devices requires restoration, according to an embodiment of the present invention. Apart from the differences described below, the actions for the steps of flowchart 60 (FIG. 3) and flowchart 260 (FIG. 7) are generally similar, and steps indicated by the same reference numerals in both flowcharts have generally identical actions.

In first step 62, by way of example device D3 is assumed to have failed.

In a second step 264. PU 28 generates a command to rebuild the data of device D3 as restored data. The processing unit transmits the command to the controller of the failed device, i.e., controller C3. Also, PU 28 selects one or more devices 22 to receive the restored data. For each given block of device D3 being restored, the processing unit selects any device 22 apart from the device holding the copy of the given block. For example, since failed device D3 stores block B3, and block B3' is stored on device D8, PU 28 may select any of devices 22 except for devices D3 and D8 to receive restored block B3.

On receipt of the command, in a third step 266, controller C3 accesses correspondence table 249 (stored in memory M3) to derive, from the preference levels listed for each block, an order for rebuilding the blocks. Alternatively, controller C3 may access table 248 in memory 30, to derive the same information that is given in table 249.

In fourth step 68, controller C3 rebuilds each of the blocks in device D3, in an order given by their respective preference level, substantially as described above for flowchart 60. The restored blocks are placed in the temporary buffer of memory M3.

In final step 70, controller C3 writes the restored values of each rebuilt block to the respective non-volatile storage devices selected in second step 264, so that the restored values are permanently recorded and are accessible. Flowchart 260 then ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for managing a data storage system, comprising:
   storing a first set of data and a second set of the data on a storage device in the data storage system;
   assigning a first restore preference level to the first set of the data and a second restore preference level to the second set of the data, the first restore preference level and the second restore preference level comprising respective restore preference levels, such that applying the first restore preference level to the first set and applying the second restore preference level to the second set rebuilds the first set before the second set irrespective of physical locations and logical addresses of the sets of the data on the storage device;
   receiving an indication of a failure in the storage device;
   in response to the indication, generating a command to rebuild the first set of the data as a first restored set of the data and the second set of the data as a second restored set of the data; and
   in response to the command, rebuilding the first set of the data and the second set of the data according to the respective restore preference levels, wherein rebuilding the first set before the second set comprises ensuring that at any time during rebuilding, an amount X of the first set of the data and an amount Y of the second set of the data have been processed, where a fraction X/Y is predefined by an operator of the storage system and where the fraction X/Y is greater than one.

2. The method according to claim 1, wherein rebuilding the first set of the data and the second set of the data comprises choosing a selected storage device to receive the first restored set of the data and the second restored set of the data.

3. The method according to claim 2, wherein the selected storage device and the storage device are a common device.

4. The method according to claim 2, wherein the selected storage device and the storage device are different devices.

5. The method according to claim 1, wherein storing the first and second sets of the data comprises storing redundancy data for the data within the storage system, and wherein rebuilding the first set of the data and the second set of the data comprises implementing the redundancy data.

6. The method according to claim 5, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the second set of the data blocks according to the respective restore preference levels.

7. The method according to claim 5, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the first set of the parity blocks, and the second set of the data blocks and the second set of the parity blocks, according to the respective restore preference levels.

8. The method according to claim 5, wherein storing redundancy data for the data comprises storing copies of the data within the storage system.

9. The method according to claim 1, wherein the first set of the data comprises a first subset of the data and a second subset of the data, wherein assigning the first preference level comprises assigning a first restore sub-preference level to the first subset and a second restore sub-preference level to the second subset, such that applying the first restore sub-preference level to the first subset and applying the second restore sub-preference level to the second subset rebuilds the first subset before the second subset irrespective of physical locations and logical addresses of the subsets of the data on the storage device, wherein generating the command comprises generating a command to rebuild the first subset of the data as a first restored subset of the data and the second subset of the data as a second restored subset of the data, and wherein rebuilding the first set of the data comprises rebuilding the first subset and the second subset according to the respective restore sub-preference levels.

10. An apparatus for managing a data storage system, comprising:

a processing unit which is configured to:

store a first set of data and a second set of the data on one of a plurality of storage devices, assign a first restore preference level to the first set of the data and a second restore preference level to the second set of the data, the first restore preference level and the second restore preference level comprising respective restore preference levels, such that applying the first restore preference level to the first set and applying the second restore preference level to the second set rebuilds the first set before the second set irrespective of physical locations and logical addresses of the sets of the data on the one storage device, receive an indication of a failure in the one storage device, in response to the indication, generate a command to rebuild the first set of the data as a first restored set of the data and the second set of the data as a second restored set of the data, and in response to the command, rebuild the first set of the data and the second set of the data according to the respective restore preference levels, wherein rebuilding the first set before the second set comprises ensuring that at any time during rebuilding, an amount X of the first set of the data and an amount Y of the second set of the data have been processed, where a fraction X/Y is predefined by an operator of the storage system and where the fraction X/Y is greater than one.

11. The apparatus according to claim 10, wherein rebuilding the first set of the data and the second set of the data comprises choosing a selected storage device from the plurality of storage devices to receive the first restored set of the data and the second restored set of the data.

12. The apparatus according to claim 11, wherein the selected storage device and the one storage device are a common device.

13. The apparatus according to claim 11, wherein the selected storage device and the one storage device are different devices.

14. The apparatus according to claim 10, wherein storing the first and second sets of the data comprises storing redundancy data for the data within the storage system, and wherein rebuilding the first set of the data and the second set of the data comprises implementing the redundancy data.

15. The apparatus according to claim 14, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the second set of the data blocks according to the respective restore preference levels.

16. The apparatus according to claim 14, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the first set of the parity blocks, and the second set of the data blocks and the second set of the parity blocks, according to the respective restore preference levels.

17. The apparatus according to claim 10, wherein the first set of the data comprises a first subset of the data and a second subset of the data, wherein assigning the first preference level comprises assigning a first restore sub-preference level to the first subset and a second restore sub-preference level to the second subset, such that applying the first restore sub-preference level to the first subset and applying the second restore sub-preference level to the second subset rebuilds the first subset before the second subset irrespective of physical locations and logical addresses of the subsets of the data on the storage device, wherein generating the command comprises generating a command to rebuild the first subset of the data as a first restored subset of the data and the second subset of the data as a second restored subset of the data, and wherein rebuilding the first set of the data comprises rebuilding the first subset and the second subset according to the respective restore sub-preference levels.

18. A computer software product for managing a data storage system, the product comprising a computer-readable medium having computer program instructions recorded therein, which instructions, when read by a computer, cause the computer to:

store a first set of data and a second set of the data on a storage device in the data storage system;

assign a first restore preference level to the first set of the data and a second restore preference level to the second set of the data, the first restore preference level and the second restore preference level comprising respective restore preference levels, such that applying the first restore preference level to the first set and applying the second restore preference level to the second set rebuilds the first set before the second set irrespective of physical locations and logical addresses of the sets of the data on the storage device;

receive an indication of a failure in the storage device;

in response to the indication, generate a command to rebuild the first set of the data as a first restored set of the data and the second set of the data as a second restored set of the data; and in response to the command, rebuild the first set of the data and the second set of the data according to the respective restore preference levels, wherein rebuilding the first set before the second set comprises ensuring that at any time during rebuilding, an amount X of the first set of the data and an amount Y of the second set of the data have been processed, where a fraction X/Y is predefined by an operator of the storage system and where the fraction X/Y is greater than one.

19. A computer software product for managing a data storage system, the product comprising a computer-readable medium having computer program instructions recorded therein, which instructions, when read by a computer, cause the computer to:

store a first set of data and a second set of the data on a storage device in the data storage system;

assign a first restore preference level to the first set of the data and a second restore preference level to the second set of the data, the first restore preference level and the second restore preference level comprising respective restore preference levels, such that applying the first restore preference level to the first set and applying the second restore preference level to the second set rebuilds the first set before the second set irrespective of physical locations and logical addresses of the sets of the data on the storage device;

receive an indication of a failure in the storage device;

in response to the indication, generate a command to rebuild the first set of the data as a first restored set of the data and the second set of the data as a second restored set of the data; and in response to the command, rebuild the first set of the data and the second set of the data according to the respective restore preference levels, wherein rebuilding the first set before the second set comprises ensuring that, at any time during rebuilding, an amount X of transactions in a transaction queue related to the first set of the data and an amount Y of transactions in the transaction queue related to the second set of the data have been processed, where a fraction X/Y is predefined by an operator of the storage system and where the fraction X/Y is greater than one.

20. A method for managing a data storage system, comprising:

storing a first set of data and a second set of the data on a storage device in the data storage system;

assigning a first restore preference level to the first set of the data and a second restore preference level to the second set of the data, the first restore preference level and the second restore preference level comprising respective restore preference levels, such that applying the first restore preference level to the first set and applying the second restore preference level to the second set rebuilds the first set before the second set irrespective of physical locations and logical addresses of the sets of the data on the storage device;

receiving an indication of a failure in the storage device;

in response to the indication, generating a command to rebuild the first set of the data as a first restored set of the data and the second set of the data as a second restored set of the data; and in response to the command, rebuilding the first set of the data and the second set of the data according to the respective restore preference levels, wherein the storage device comprises a pending transaction queue, and wherein rebuilding the first set before the second set comprises ensuring that, at any time during rebuilding, an amount X of transactions in the queue related to the first set of the data and an amount Y of transactions in the queue related to the second set of the data have been processed, where a fraction X/Y is predefined by an operator of the storage system and where the fraction X/Y is greater than one.

21. The method according to claim 20, wherein rebuilding the first set of the data and the second set of the data comprises choosing a selected storage device to receive the first restored set of the data and the second restored set of the data.

22. The method according to claim 21, wherein the selected storage device and the storage device are a common device.

23. The method according to claim 21, wherein the selected storage device and the storage device are different devices.

24. The method according to claim 20, wherein storing the first and second sets of the data comprises storing redundancy data for the data within the storage system, and wherein rebuilding the first set of the data and the second set of the data comprises implementing the redundancy data.

25. The method according to claim 24, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the second set of the data blocks according to the respective restore preference levels.

26. The method according to claim 24, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the first set of the parity blocks, and the second set of the data blocks and the second set of the parity blocks, according to the respective restore preference levels.

27. The method according to claim 24, wherein storing redundancy data for the data comprises storing copies of the data within the storage system.

28. The method according to claim 20, wherein the first set of the data comprises a first subset of the data and a second subset of the data, wherein assigning the first preference level comprises assigning a first restore sub-preference level to the first subset and a second restore sub-preference level to the second subset, such that applying the first restore sub-preference level to the first subset and applying the second restore sub-preference level to the second subset rebuilds the first subset before the second subset irrespective of physical locations and logical addresses of the subsets of the data on the storage device, wherein generating the command comprises generating a command to rebuild the first subset of the data as a first restored subset of the data and the second subset of the data as a second restored subset of the data, and wherein rebuilding the first set of the data comprises rebuilding the first subset and the second subset according to the respective restore sub-preference levels.

29. An apparatus for managing a data storage system, comprising:
a processing unit which is configured to:
store a first set of data and a second set of the data on one of a plurality of storage devices,
assign a first restore preference level to the first set of the data and a second restore preference level to the second set of the data, the first restore preference level and the second restore preference level comprising respective restore preference levels, such that applying the first restore preference level to the first set and applying the second restore preference level to the second set rebuilds the first set before the second set irrespective of physical locations and logical addresses of the sets of the data on the one storage device,
receive an indication of a failure in the one storage device,
in response to the indication, generate a command to rebuild the first set of the data as a first restored set of the data and the second set of the data as a second restored set of the data, and
in response to the command, rebuild the first set of the data and the second set of the data according to the respective restore preference levels, wherein the one storage device comprises a pending transaction queue, and wherein rebuilding the first set before the second set comprises configuring the processing unit to ensure that, at any time during rebuilding, an amount X of transactions in the queue related to the first set of the data and an amount Y of transactions in the queue related to the second set of the data have been processed, where a fraction X/Y is predefined by an operator of the storage system and where the fraction X/Y is greater than one.

30. The apparatus according to claim 29, wherein rebuilding the first set of the data and the second set of the data comprises choosing a selected storage device from the plurality of storage devices to receive the first restored set of the data and the second restored set of the data.

31. The apparatus according to claim 30, wherein the selected storage device and the one storage device are a common device.

32. The apparatus according to claim 30, wherein the selected storage device and the one storage device are different devices.

33. The apparatus according to claim 29, wherein storing the first and second sets of the data comprises storing redundancy data for the data within the storage system, and wherein rebuilding the first set of the data and the second set of the data comprises implementing the redundancy data.

34. The apparatus according to claim 33, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the second set of the data blocks according to the respective restore preference levels.

35. The apparatus according to claim 33, wherein the first set of data comprises a first set of data blocks and a first set of parity blocks included in the redundancy data, and wherein the second set of data comprises a second set of data blocks and a second set of parity blocks included in the redundancy data, and wherein rebuilding the first set of the data and the second set of the data comprises rebuilding the first set of the data blocks and the first set of the parity blocks, and the second set of the data blocks and the second set of the parity blocks, according to the respective restore preference levels.

36. The apparatus according to claim 29, wherein the first set of the data comprises a first subset of the data and a second subset of the data, wherein assigning the first preference level comprises assigning a first restore sub-preference level to the first subset and a second restore sub-preference level to the second subset, such that applying the first restore sub-preference level to the first subset and applying the second restore sub-preference level to the second subset rebuilds the first subset before the second subset irrespective of physical locations and logical addresses of the subsets of the data on the storage device, wherein generating the command comprises generating a command to rebuild the first subset of the data as a first restored subset of the data and the second subset of the data as a second restored subset of the data, and wherein rebuilding the first set of the data comprises rebuilding the first subset and the second subset according to the respective restore sub-preference levels.

\* \* \* \* \*